(12) United States Patent
Libby et al.

(10) Patent No.: US 11,880,419 B2
(45) Date of Patent: Jan. 23, 2024

(54) SYSTEMS AND METHODS FOR IMPLEMENTING SOFT LOCKING IN A STATELESS MICROSERVICE ENVIRONMENT

(71) Applicant: Microsoft Technology Licensing, LLC, Redmond, WA (US)

(72) Inventors: Mark Libby, Groton, MA (US); Ronald M. Parker, Boxborough, MA (US); Haibo Qian, Frisco, TX (US)

(73) Assignee: Microsoft Tech nology Licensing, LLC, Redmond, UT (US)

( * ) Notice: Subject to any disclaimer, the term of this patent is extended or adjusted under 35 U.S.C. 154(b) by 509 days.

(21) Appl. No.: 17/066,547

(22) Filed: Oct. 9, 2020

(65) Prior Publication Data

US 2021/0109978 A1    Apr. 15, 2021

Related U.S. Application Data

(60) Provisional application No. 62/912,936, filed on Oct. 9, 2019.

(51) Int. Cl.
*G06F 16/953* (2019.01)
*G06F 16/2455* (2019.01)

(52) U.S. Cl.
CPC ........ *G06F 16/953* (2019.01); *G06F 16/2455* (2019.01)

(58) Field of Classification Search
CPC .......................... G06F 16/953; G06F 16/2455
USPC ....................................................... 707/769
See application file for complete search history.

(56) References Cited

U.S. PATENT DOCUMENTS

| | | | | |
|---|---|---|---|---|
| 11,051,192 B2* | 6/2021 | Li | ............................ | H04L 41/14 |
| 11,457,082 B2* | 9/2022 | Han | ......................... | H04W 4/50 |
| 2012/0166481 A1* | 6/2012 | Dittrich | .................... | G06F 9/505 |
| | | | | 707/E17.014 |
| 2016/0127808 A1* | 5/2016 | Wong | ..................... | H04M 15/08 |
| | | | | 379/112.04 |
| 2016/0147560 A1* | 5/2016 | Jolfaei | ..................... | G06F 9/466 |
| | | | | 718/101 |
| 2018/0262573 A1* | 9/2018 | Przybylski | ........... | G06F 11/3058 |
| 2019/0041835 A1* | 2/2019 | Cella | ...................... | G01M 13/04 |
| 2019/0279151 A1* | 9/2019 | Felice | ................ | G06Q 10/0833 |
| 2019/0312979 A1* | 10/2019 | Sharma | ................. | H04M 15/72 |
| 2020/0127939 A1* | 4/2020 | Parker | .................... | G06F 9/5016 |
| 2020/0177677 A1* | 6/2020 | Yang | ....................... | H04L 67/51 |
| 2020/0348662 A1* | 11/2020 | Cella | .................. | G05B 23/0286 |

(Continued)

OTHER PUBLICATIONS

"International Search Report and Written Opinion Issued in PCT Application No. PCT/US20/055091", dated Jan. 21, 2021, 17 Pages.

*Primary Examiner* — Mark E Hershley
(74) *Attorney, Agent, or Firm* — Ray Quinney & Nebeker; James Bullough

(57) ABSTRACT

A network function is implemented using cloud native architecture. The network function utilizes one or more loosely coupled and independently deployable microservice instances to perform services. To retain state between independent transactions, a microservice instance takes a soft lock on state data in an external database. The soft lock makes the state data unavailable except to the microservice instance. After the microservice instance completes the transaction, the microservice instance clears the lock so that the state data is available for use by other microservices.

20 Claims, 11 Drawing Sheets

(56) References Cited

U.S. PATENT DOCUMENTS

2021/0144013 A1\* 5/2021 Chen .................... H04L 9/0894
2022/0171648 A1\* 6/2022 Rodriguez ............ G06F 9/5072
2022/0303331 A1\* 9/2022 Svennebring .... H04N 21/44209

\* cited by examiner

SYSTEMS AND METHODS FOR IMPLEMENTING SOFT LOCKING IN A STATELESS MICROSERVICE ENVIRONMENT

CROSS-REFERENCE TO RELATED APPLICATION

This application is related to and claims the benefit of U.S. Provisional Patent Application No. 62/912,936, filed Oct. 9, 2019. The aforementioned application is expressly incorporated herein by reference in its entirety.

BACKGROUND

Cloud computing is the delivery of computing services (e.g., servers, storage, databases, networking, software, analytics) over the Internet. Generally, cloud computing systems may be designed using industry standards and/or a system architecture. Examples of industry standards may be the standards set forth by the 3rd Generation Partnership Project (3GPP) for various wireless network communication protocols, such as 3G, 4GLTE, and 5G mobile communication networks.

A conventional 3GPP network function (NF) provides services in the form of procedures. A 3GPP NF procedure can be comprised of multiple incoming transactions and can result in multiple downstream transactions, at the same or other NFs. As a result, 3GPP procedures are stateful, because subsequent transactions use results or data on one or more previous transactions. For instance, future interactions depend on the current state of the procedure and the results of the various service calls to other NFs.

An example of a system architecture for a cloud computing network is Cloud Native Architecture (CNA). CNA breaks down a procedure using one or more stateless microservice instances to perform related services. Each stateless microservice instance is intended to handle a piece of work to completion. Any state required for the transaction is fetched from an external store, and any updates to the state must be written to the external storage. Once the work is completed, there is no leftover state from the transaction in the microservice instance. In this fashion a microservice instance can handle any piece of supported work at any time. In addition, microservice instances can come and go without affecting the service being offered. In this manner, a cloud computing system using CNA may increase the flexibility and versatility of the network.

However, a network may include multiple NFs and/or microservices that perform related transactions and/or procedures. In some instances, different procedures can be initiated simultaneously by different NFs or microservices. If two procedures utilize and/or modify the same state data, then this may result in two different sets of results or state data. To maintain network continuity and avoid conflicting results or sequence issues, these conflicts or collisions may be resolved in a stateful fashion. To implement a 3GPP Network Function in a cloud native architecture, there is a need to resolve the stateful vs. stateless nature of the two architectures.

As an example of a stateful network function, for user equipment (UE), a session management function (SMF) allocates a state object. The state information includes, among others, the user identity (e.g., subscription permanent identifier (SUPI) or permanent equipment identifier (PEI)), an SMF session ID, user plane information (such as session endpoint identifier (SEID), general packet radio service (GPRS) tunneling protocol (GTP-U), user IP addresses), and temporary information pertaining to the procedure currently being run (if applicable). Incoming transactions may trigger new procedures to be run against the UE state object. If two transactions arrive for the same UE state object, in order to avoid incompatible changes to the UE state object, the multiple transactions need to be handled by the same entity. This allows the incoming transactions to be sequenced to avoid changes that result in inconsistent local and remote state. Conventionally, the UE state object is owned (state is held in memory) by a specific compute node instance within the network function. All incoming transactions are routed to the compute node for processing, allowing collision conditions to be detected and resolved statefully.

Conventionally, the problems regarding these network functions may be resolved by making network functions in a CNA stateful. However, making the network functions stateful may reduce the effectiveness of a CNA and may require changes to many of the third-party tools used in a cloud native architecture. In some instances, the statelessness of CNA may be retained at the expense of network procedure consistency. However, stateless network functions may complicate reconciliation of the network-wide state at the end of multiple, simultaneous procedures. It is likely that a collision of procedures in this case will result in unpredictable network behavior.

In some instances, the challenges faced by network functions in a CNA may be resolved using a native database hard lock. In this fashion, only one microservice instance can write a specific record to the database at any point in time. There are multiple drawbacks to this approach. For example, multiple microservice instances may contend for access to the database. One of the two microservice instances may acquire the lock to the database. Once the database is locked, the locking microservice instance may not be known, and the second microservice instance may not have a way to perform its transaction. In some instances, if the locking microservice instance crashes, the database lock may not be automatically removed. This may result in no transactions getting processed for an extended period of time while the lock is in place, even if there is a lock timeout.

SUMMARY

In accordance with one aspect of the present disclosure, a method is disclosed for performing a transaction implemented on a network function utilizing cloud native architecture. The network function is based on stateless microservices. The stateless microservices are independently deployable to perform services. The method includes receiving an external trigger for a microservice instance to perform a service and querying an external database for state data. The state data includes information from previous transactions to affect processing of the transaction. The external database is external to the microservice instance. The method also includes retrieving the state data from the external database and taking a lock on the state data in the external database such that the state data is unavailable except by the microservice instance. The method also includes, using the state data, performing the service at the microservice instance. The method also includes, after performing the service, clearing the lock on the state data in the external database.

The method may further include updating the state data on the external database.

The method may further include associating an identity of the network function with the state data on the network function.

The method may further include sending a result of the service.

The external trigger may be a first external trigger and the service may be a first service. The method may further include invoking a timer. An expiration of the timer may trigger a second external trigger for a second service.

The service may include a plurality of transactions.

The service may include communication with an external network element.

Taking the lock may include storing a state data status in external storage. The external storage may be external to the network function.

In accordance with another aspect of the present disclosure, a method is disclosed for performing a procedure implemented on a network function utilizing cloud native architecture. The network function is based on stateless microservices. The stateless microservices are independently deployable to perform discrete services. The discrete services include, at a first microservice instance, querying an external database for state data. The state data includes information from previous transactions to affect processing of the procedure. The external database is external to the first microservice instance. The discrete services also include, at a first microservice instance, retrieving the state data from the external database. The discrete services also include, at a first microservice instance, taking a lock on the state data in the external database such that the state data is unavailable except by the first microservice instance. The discrete services also include, at a second microservice instance, querying the external database for state data. The external database is external to the second microservice instance. The discrete services also include, at a second microservice instance, receiving a notification that the lock on the state data is taken and that the state data is unavailable.

The method may further include, at the second microservice instance, waiting to perform a service until the lock is cleared.

The method may further include, at the second microservice instance, based on the lock, assigning a service to the first microservice instance.

The method may further include, at the first microservice instance, performing the service assigned by the second microservice instance.

The method may further include, at the first microservice instance, sending a result of the service to the second microservice instance.

The method may further include, at the first microservice instance, performing a service using the state data.

The method may further include, at the first microservice instance prior to querying the external database, receiving a first external trigger to perform a service.

The method may further include, at the second first microservice instance prior to querying the external database, receiving a second external trigger to perform a service.

In accordance with another aspect of the present disclosure, a method is disclosed for managing state data for use by a network function utilizing cloud network architecture. The network function is based on stateless microservices. The stateless microservices are independently deployable to perform discrete services, including receiving a first request for the state data from a first microservice instance. The state data includes information from previous transactions to affect processing of subsequent transactions. The stateless microservices further include, based on the first request, sending the state data to the first microservice instance. The stateless microservices further include receiving an instruction from the first microservice instance to take a lock on the state data such that the state data is unavailable except by the first microservice instance. The instruction includes an identification of the first microservice instance. The stateless microservices further include, after receiving the instruction, receiving a second request for the state data from a second microservice instance. The stateless microservices further include, based on the second request, notifying the second microservice instance of the lock and the identification of the first microservice instance to the second microservice instance.

The method may further include, after sending the state data, receiving, from the first microservice instance, updated state data. The method may further include changing the state data with the updated state data.

The instruction may be a first instruction and the lock may be a first lock and the identification may be a first identification. The method may further include receiving a second instruction to clear the lock. The method may further include, based on the second instruction, clearing the lock such that the updated state data is available. The method may further include, after clearing the lock, receiving a third request for the state data from a third microservice instance. The method may further include, based on the third request, sending the updated state data to the third microservice instance. The method may further include receiving a third instruction to take a second lock on the updated state data. The second instruction may include a second identification of the third microservice instance.

The method may further include, after notifying the second microservice instance of the lock and the identification of the first microservice instance, assigning the second request to the first microservice instance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying Figures. Understanding that the drawings depict some example embodiments, the embodiments will be described and explained with additional specificity and detail through the use of the accompanying drawings in which.

DETAILED DESCRIPTION

Figure 1:
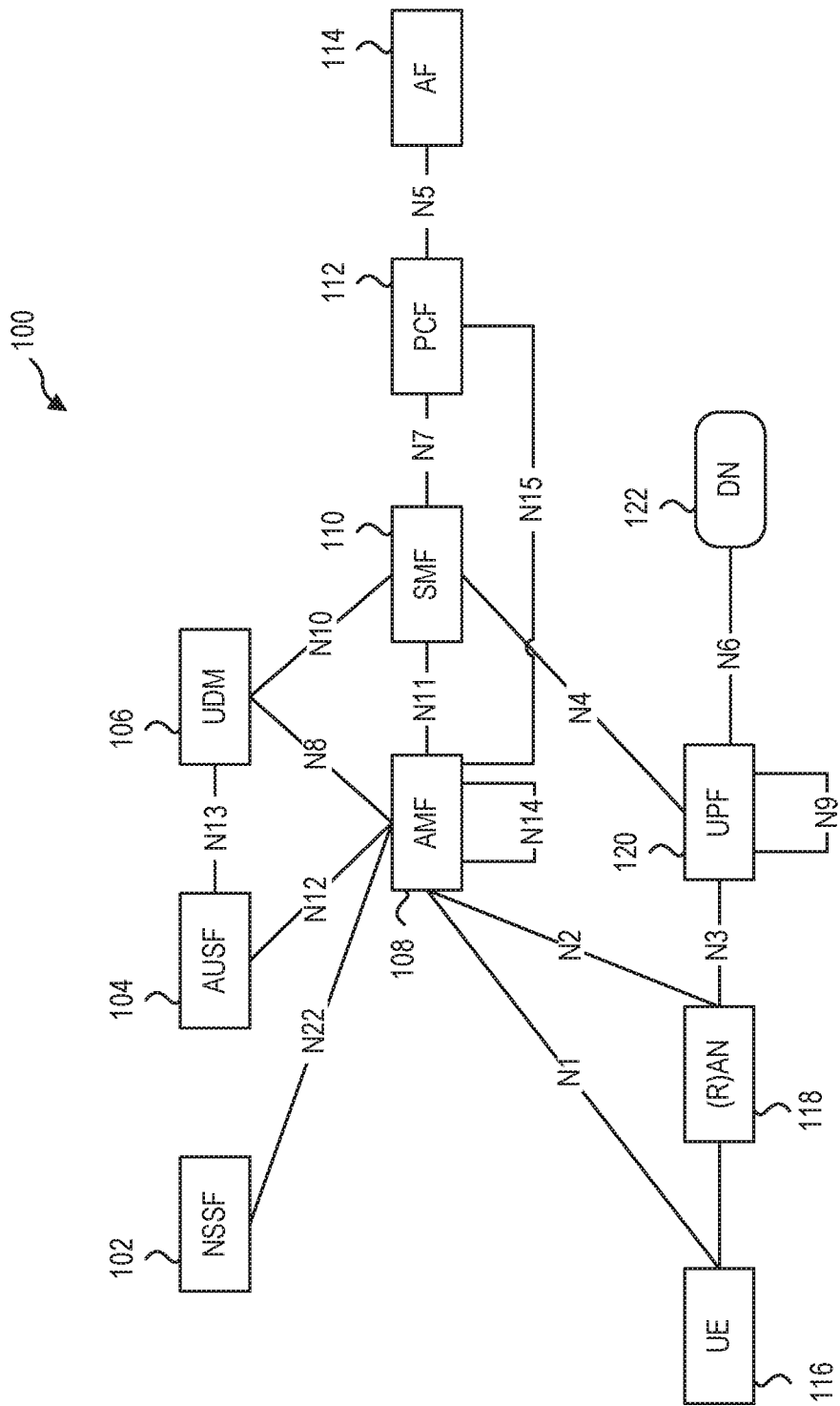
FIG. 1 is a representation of a 5G system architecture, according to at least one embodiment of the present disclosure.

This disclosure relates to devices, systems, and methods for using state data throughout a procedure performed using stateless microservices. When a microservice associated with a network function (NF) receives a trigger to perform a transaction, the microservice may query an external database for state data for the transaction. The database may send the state data to the microservice, and the microservice may take a soft lock on the database to make the state data unavailable except by the owning microservice and identify the owning microservice in the lock. If a second microservice queries the external database for the state data, the external database may provide the second microservice with a notification of the lock. The second microservice may either assign the desired service to the microservice that took the lock on the database, wait until the lock is cleared and then perform the service, or send an error report to the requesting entity. Locking the database in this manner may help to reduce and/or prevent erroneous results caused by two microservices using the same state data.

In accordance with embodiments of the present disclosure, a network may be constructed or formed from one or more interconnected network functions. The network may be any wireless network, such as a 3GPP telecommunication network, including a 5G network. The network functions may be elements of the networks that have interfaces, specific functionality, and performs a role within the network. The network function may be a physical element, a virtual element, or a combination of physical and virtual elements. Examples of network functions include a session management function (SMF), an authentication server function (AUSF), a network slice selection function (NSSF), a unified data management (UDM), an access and mobility management function (AMF), a policy control function (PCF), a user plane function (UPF), an application function (AF), a (radio access network ((R)AN), a data network (DN), a control plane (CP), any other network function, and combinations thereof.

Elements of the network may be assembled or built using cloud network architecture (CNA). According to embodiments of the present disclosure, cloud network architecture is a design scheme or plan for creating cloud applications. The elements of CNA are designed to be loosely coupled and independently deployable. By breaking a single application down into these discrete elements, a cloud application may take advantage of the unique aspects of cloud computing, such as distributing processing power over one or more virtual machines or physical servers. CNA may increase the versatility of an application by allowing one element of the application to be modified without modifying the entire application. In some instances, elements of a network designed under CNA may be stateless. This may help improve the versatility of the network, because the various elements may not need to communicate or retain state data during operation.

Networks designed using CNA may utilize one or more microservices. According to embodiments of the present disclosure, microservices may be operational units of a cloud network application. Each microservice may be designed to perform a specific, discrete task, including processing, data storage, communication, other application tasks, and combinations thereof. In some embodiments, the operation of the network application may be an aggregation or combination of the functions of multiple microservices. In some embodiments, each microservice may utilize its own application programming interface (API), or multiple microservices may utilize a common API. In some embodiments, after each use, the microservice may delete or wipe any acquired state data. For instance, a microservice performing a service may develop state data specific to and used during that process. However, after the microservice performs the service, then the state data may be deleted from the memory resource used by the microservice. In this manner, the microservices used may be stateless microservices, meaning that state data is not retained and updated from use to use and that state data may not be communicated between different microservices. A network designed using microservices may therefore be versatile, scalable, and easily modified.

An application may use state data to provide results specific to a set of conditions. A network element is considered to be stateful if state data of the application is held in memory and easily accessible by the application. Examples of state data may include user information, remote device information, network information, routing information, bandwidth information, any other state information, and combinations thereof. In a stateful application or service, current and future transactions and/or procedures may depend upon state data that has been modified by previous transactions and/or procedures. In other words, a stateful application has transactions or procedures that may operate sequentially, with at least some of the previous transactions or procedures modifying state data to be used by subsequent transactions or procedures. The subsequent transactions or procedures may have results that are dependent upon (e.g., change based on) the state data provided by the preceding transactions or procedures.

A network element (such as a microservice) is considered to be stateless if, after an interaction or an operation is completed, the software that performed the interaction or operation flushes the state information from local storage. A stateless microservice may send and/or retrieve state data from external (e.g., remote, not local) storage, but will not retain state data in memory (e.g., persistence storage) between transactions.

Conventional network functions (such as 3GPP network functions) provide services in the form of procedures. According to embodiments of the present disclosure, a procedure may be a combination of multiple transactions performed by a network function or a microservice. A transaction may include be an operation that includes a request and a response. For example, a network function may receive an external trigger to perform a procedure. The external trigger to the network function, and the subsequent response by the network function, constitute an external transaction. To perform the requested external transaction (as viewed by the external entity), the network function may execute a procedure consisting of multiple internal transactions. In some embodiments, a microservice performing one of the internal transactions may further execute a procedure consisting of multiple transactions, and so forth. In other words, according to embodiments of the present disclosure, a transaction may result in multiple downstream transactions to other network functions. In this manner, a network function may be stateful.

According to embodiments of the present disclosure, a "soft lock" may be placed on state data in an external database. A soft lock is a software construct that allows a network procedure to retain state during the execution of the procedure while providing for the network function to reside in a CNA environment. The soft lock provides each first microservice instance an opportunity to defer work on a transaction (part of an existing 3GPP procedure or start of a new 3GPP procedure) to the specific microservice instance that is currently running a 3GPP procedure (and holding the soft lock) while still retaining the stateless properties of a cloud native application for purposes of resiliency and scale. For the purposes of this disclosure, and unless otherwise stated, a lock discussed in the context of an external database or a database is to be considered a soft lock.

At the start of a network procedure, the first transaction triggers the creation of the soft lock. The handling microservice instance stores its identity in an external storage as soon as it reads the state at the beginning of the procedure. For the duration of the soft lock, any microservice instance that reads the state due to the receipt of an external transaction will defer the processing of the transaction, either by forwarding the transaction to the owner of the soft lock or by waiting until the soft lock is removed before processing the transaction. At the completion of the 3GPP procedure (end of the last transaction), the handling microservice writes out the final state and removes the soft lock from the external storage. This is called flushing the state.

If two microservice instances attempt to take the soft lock simultaneously (due to a collision of the start of two 3GPP procedures), the "check and set" (CAS) functionality of the database guarantees that only one instance takes the lock by only allowing one soft lock to be written to the external storage. The losing microservice instance can then defer the processing of the transaction to the microservice instance holding the soft-lock. A soft lock is managed solely by the application—the only requirement is that the external storage supports the common CAS in which writers verify that the database entry has not changed before writing the updated record. This prevents two microservice instances from claiming the soft lock if they simultaneously try to write the lock to the database. A soft lock is implemented as a specific value in a specific field in the external storage record. The value written contains enough information so that a reader of the record can identify the lock owner in case it needs to defer incoming work to the owning microservice instance.

If a microservice instance is removed from service during the running of a procedure, any state that hasn't been written to external storage is lost. This is no different than a network function running in a traditional architecture when the compute node running a specific procedure fails prior to completion of the procedure. The soft lock will be removed by the next microservice instance that attempts to handle a transaction—it will detect that the owning microservice instance is no longer present and will take the lock itself. After taking the lock it will process the transaction as normal.

Using this soft lock approach, all of the CNA can be used unchanged, allowing for the fast adoption of third-party tools and the all the benefits of a stateless architecture. In addition, network procedures may run as intended with predictable and consistent results.

FIG. 1 is a diagram showing 5G system architecture, according to some embodiments. In some embodiments, the 5G system architecture 100 is defined to support data connectivity and services enabling deployments to use techniques such as e.g. network function virtualization and software defined networking. In some embodiments, the system architecture 100 includes an authentication server function (AUSF) 104, a network slice selection function (NSSF) 102, and a unified data management (UDM) 106 connected to access and mobility management function (AMF) 108 via connections N22, N12, and N8. AUSF 104 is connected to UDM 106 via connection N13. UDM 106 is connected to session management function (SMF) 110 via connection N10. SMF 110 is connected to AMF 108 via connection N11, to policy control function (PCF) 112 via connection N7 and to user plane function (UPF) 120 via connection N4. PCF 112 is also connected to application function (AF) 114 via connection N5 and to AMF 108 via connection N15.

AMF 108 is connected to user equipment (UE) 116 and (Radio) Access Network ((R)AN) 118 via connections N1 and N2. UE 116 is connected to ((R)AN) 118. ((R)AN) 118 is connected to UPF 120 via connection N3. UPF 120 is connected to data network (DN) 122 via connection N6. In some embodiments, DN may include operator services, Internet access or 3rd party services. The 5G system architecture leverages service-based interactions between control plane (CP) network functions where identified. In some embodiments, the separation of UPF 120 from the CP functions allows independent scalability, evolution and flexible deployments e.g. centralized location or distributed (remote) location. In some embodiments, the modular design of the network architecture enables flexible and efficient network slicing. In some embodiments, procedures (i.e. the set of interactions between network functions) defined in this architecture as services, are re-usable.

In some embodiments, the architecture enables each network function and its network function services to interact with other network functions and their network function services directly or indirectly via a service communication proxy if required. The architecture does not preclude the use of another intermediate function to help route control plane messages (e.g. like an HTTP Proxy). In some embodiments. The architecture minimizes dependencies between the access network (AN) and the core network (CN). The architecture is defined with a converged core network with a common AN-CN interface which integrates different Access Types e.g. 3GPP access and non-3GPP access. In some embodiments, the architecture supports "stateless" NFs, where the "compute" resource is decoupled from the "storage" resource.

Figure 2:
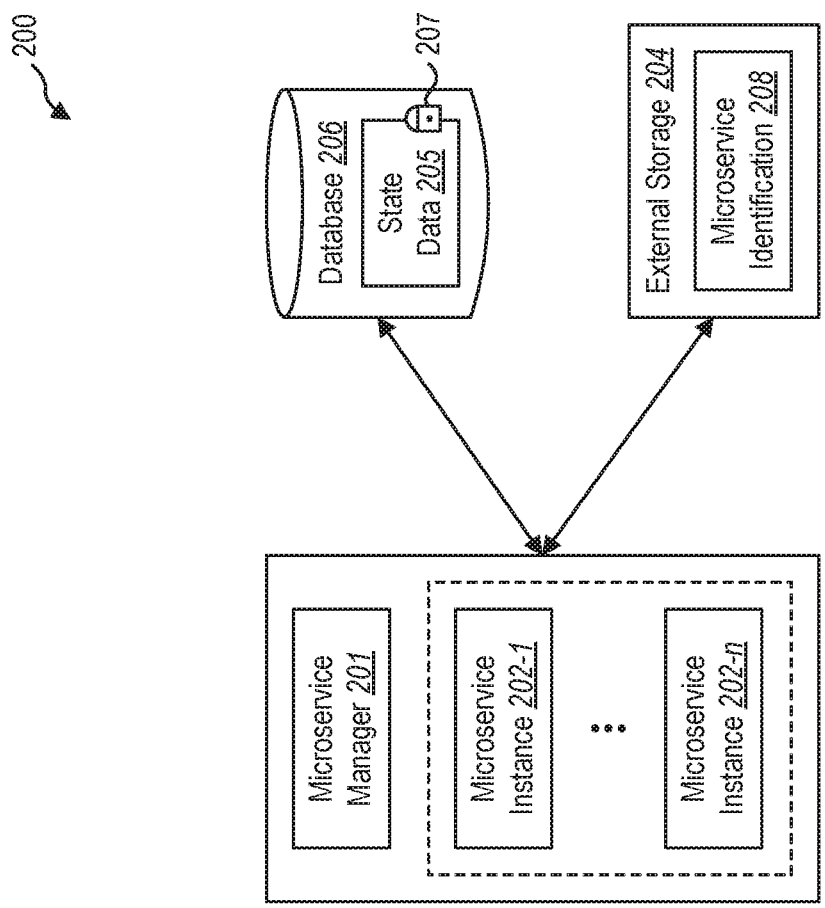
FIG. 2 is a representation of a network showing a microservice manager interacting with a database, according to at least one embodiment of the present disclosure.

FIG. 2 is a diagram showing a microservice manager interacting with a database, according to some embodiments. The system 200 depicts a microservice manager 201 that includes a first microservice instance 202-1, second, third, and so forth microservice instances, and so on, till microservice instance 202-n. An external database 206 external to the microservice manager 201 may store state data 205. A state data status 208 may be stored in external storage 204 external to the microservice manager 201. In some embodiments, the external storage 204 may be a part of the database 206. In some embodiments, the external storage 204 may be separate from the database 206.

In some embodiments, the first microservice instance 202-1 may receive a procedure that utilizes state data 205 stored in the database 206. The first microservice instance 202-1 may retrieve state data 205 from the database 206 and take a soft lock 207 (e.g., a "lock 207") on the state data 205 in the database 206. In some embodiments, the first microservice instance 202-1 may request and lock all of the state data 205 stored in the database 206. In some embodiments, the first microservice instance 202-1 may request and lock only the portions of the state data relevant to the procedure to be performed. In some embodiments, another microservice may utilize the portion of the state data that is unlocked while the first microservice instance uses the other portion of the state data 205. In other words, in some embodiments, different portions of the state data 205 may be used simultaneously and independently locked by different microservice instances. In some embodiments, particularly in a 3GPP wireless network, the state data 205 for each user device (e.g., user equipment, UE) may have its own soft lock 207.

The lock 207 may make the state data 205 unavailable except by the first microservice instance. In other words, the lock 207 may make the state data 205 unavailable to the other microservice instances 202-n. In some embodiments, with the lock 207 in place, the other microservices instances 202-n may read the state data, but not modify or use the state data in a transaction. In some embodiments, the other microservices 202-n may not read the values of the state data. In some embodiments, once the first microservice instance 202-1 acquires the lock 207 for database 206, state data status 208 may be stored in external storage 204. The state data status may include the status of the lock 207 (e.g., taken or cleared), the availability of the state data, the microservice identity of the owning microservice instance (e.g., the first microservice instance 202-1), other state data status, and combinations thereof.

In some embodiments, another microservice instance 202-n may receive a procedure to run on the database 206 and/or using the state data 205. The other microservice instance 202-n may receive an indication that the lock 207 is taken on the state data 205. For example, the other microservice instance 202-n may query the database 206 regarding the state data 205, and may receive a notification from the database 206 that the state data is unavailable. In some examples, the other microservice instance 202-n may query the external storage 204 and may receive a notification that the lock 207 is taken on the state data and that the owner of the lock 207 is the first microservice instance 202-1. In some embodiments, the other microservice instance 202-n may review the external storage 204 for the state data status. In some embodiments, the other microservice instance 202-n may identify whether the lock 207 is available, which may indicate whether the other microservice instance 202-n may use the state data 205.

If the lock 207 is not available (e.g., if the state data 205 is not available), the other microservice instance 202-n may off-load the task to the microservice instance that is currently holding the lock 207 for the database 206. In some embodiments, the other microservice instance 202-n may wait until the state data 205 is available (e.g., wait until the lock 207 is cleared, wait until the lock 207 is available) to perform the transaction. In some embodiments, the other microservice instance 202-n may provide an error report to the requesting entity regarding the inability to perform the transaction because of the lock 207 on the state data 205. The action taken by the other microservice instance 202-n may depend upon the transaction requested. In some embodiments, the requesting entity may specify which action the other microservice instance 202-n should take if the state data 205 is unavailable.

In some embodiments, when the first microservice instance 202-1 has finished the requested transaction, it may clear (e.g., remove) the lock 207 on the state data 205. This may make the state data 205 available for any other microservice instances to use. In some embodiments, the first microservice instance 202-1 may update the state data 205 with updated state data. In some embodiments, the first microservice instance 202-1 may update the state data 205 before clearing the lock 207. In some embodiments, the first microservice instance 202-1 may update the state data 205 while clearing the lock 207 (e.g., at the same time). In some embodiments, the first microservice instance 202-1 may update the state data 205 after the lock 207 is cleared but before the other microservice instance 202-n takes a new lock 207 on the state data. In some embodiments, when the first microservice instance 202-1 clears the lock 207, the first microservice instance 202-1 may update the state data status 208 on the external storage 204, such as by clearing the state data status 208, or updating the state data status 208 to include an indication that the lock is available. In some embodiments, the database 206 and/or the external storage 204 may retain a record of the identity of each microservice instance that takes a lock 207 on the state data 205.

By storing the state data 205 on a database 206 external to the microservice, the state data 205 may be retained in long-term memory. In other words, the state data 205 may not be wiped with the completion of the transaction by each microservice instance. Furthermore, taking the lock 207 on the state data 205 may prevent conflicting and/or erroneous results in the network application and/or network function caused by different microservice instances using and/or modifying the state data 205 at the same time. This may help to improve network application reliability and/or functionality.

Figure 3:
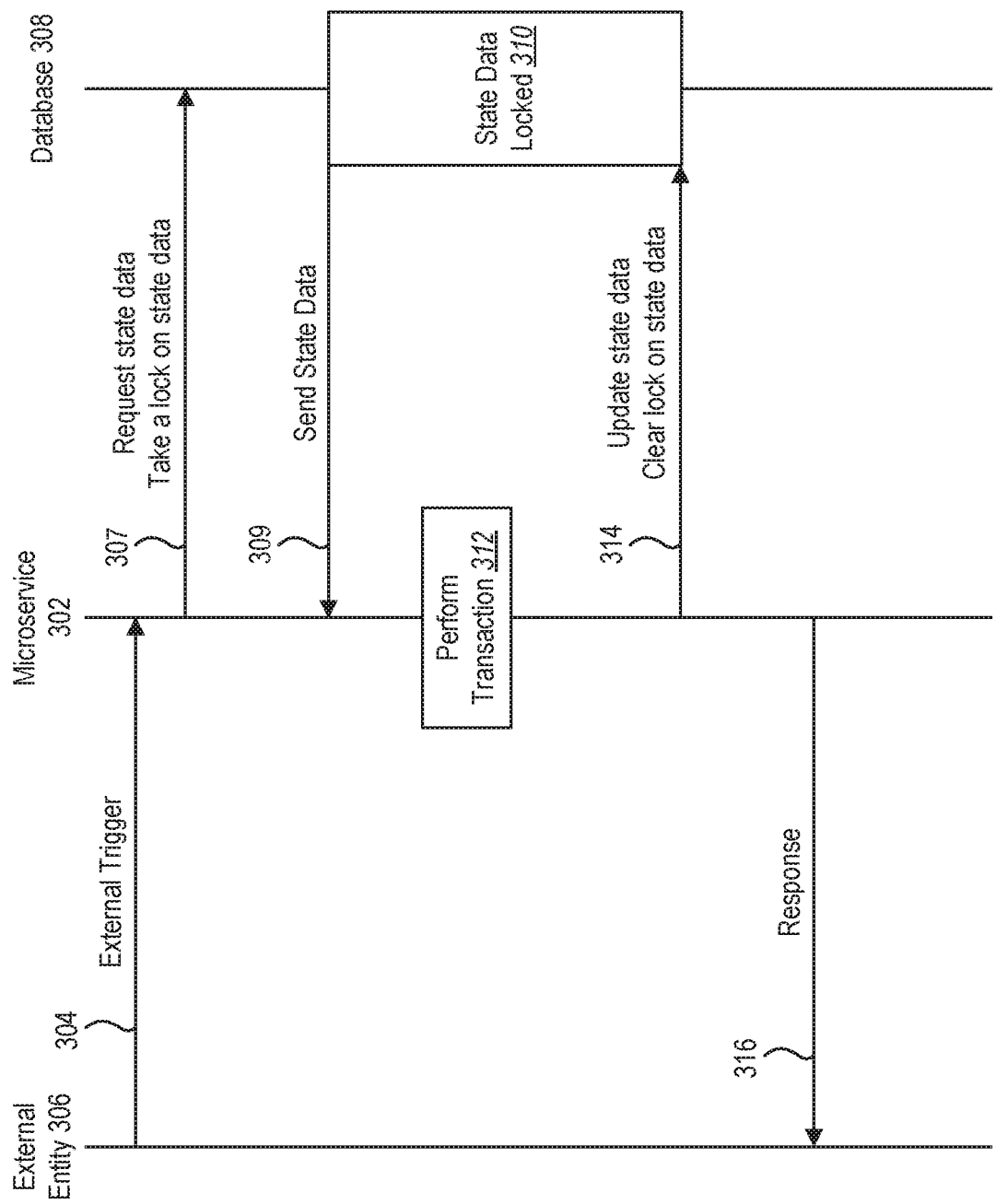
FIG. 3 is a representation of a network transaction implemented in a stateless cloud native environment, according to at least one embodiment of the present disclosure.

FIG. 3 is a representation of potential operations of a microservice instance 302 operating on a network, according to at least one embodiment of the present disclosure. The microservice instance 302 may be representative of any transaction or procedure performed by a microservice instance 302 (or a network function directing one or more microservice instances) that takes a lock on state data in an external database. In accordance with embodiments of the present disclosure, the microservice instance 302 may receive an external trigger 304 from an external entity 306. The external entity 306 may be any entity external to the microservice instance 302. For example, the external entity 306 may be a user device, a cloud computing element, a network function, a network administrator/engineer, an application, any other entity, and combinations thereof. The external trigger 304 may be any trigger to perform the operation. For example, the external trigger 304 may be an instruction, a notification, a signal, a timer, a message, any other trigger, and combinations thereof.

After receiving the external trigger 304, the microservice instance 302 may send a request 307 to a database 308. The request 307 may include a request for state data to be used during the operation of the microservice instance. In some embodiments, the request may further include an instruction for the database 308 to take a lock on the state data.

The database 308 may take a lock on the state data, and send a response 309 including the state data back to the microservice instance 302. The state data may then be locked 310 such that the state data is unavailable except by the microservice instance 302. In other words, only the microservice instance may utilize the state data in the database 308 and remove the lock 310 on the database 308.

After receiving the state data, the microservice instance 302 may perform the transaction 312 using the state data. When the microservice instance 302 has completed the transaction, the microservice instance 302 may send an update 314 to the database 308. The update 314 may include updated state data and include an instruction to clear the lock 310 on the state data. The state data may now be available for use by another microservice instance or other network element. The microservice instance 302 may then send a response 316 to the external entity that includes the results of the transaction 312. Locking the state data until the transaction 312 is completed may help to prevent conflicting and/or erroneous results from concurrent and/or subsequent transactions by other network elements that may use the same state data. This may improve application and/or network functionality and/or reliability.

Figure 4:
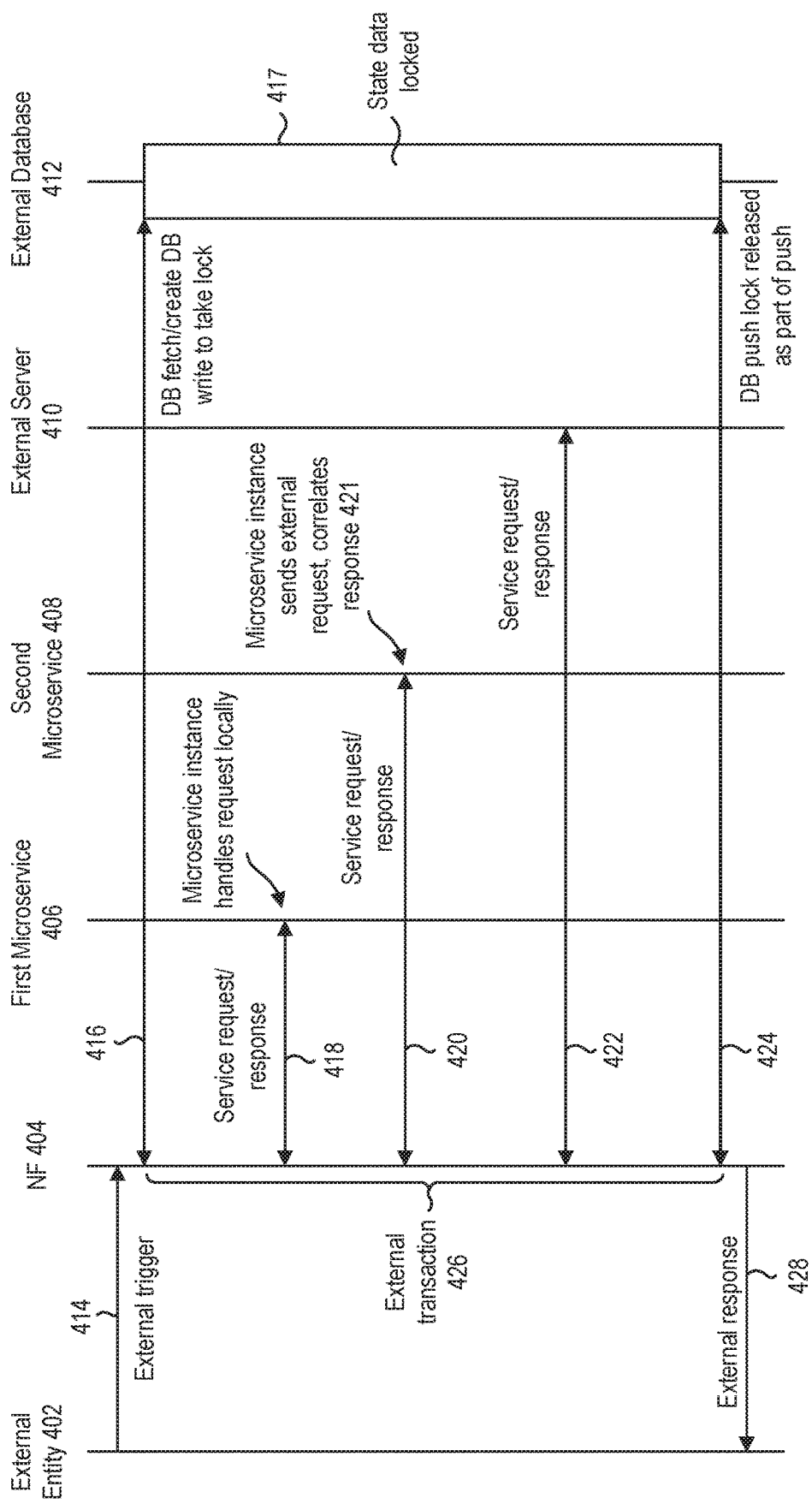
FIG. 4 is a representation of another network transaction implemented in a stateless cloud native architecture, according to at least one embodiment of the present disclosure.

FIG. 4 is a diagram showing the anatomy of a network (such as a 3GPP) transaction implemented in a stateless CNA environment, according to at least one embodiment of the present disclosure. The network transaction shown may include a single external transaction 426 performed by a network function 404. The single external transaction 426 may include multiple internal transactions that are performed and/or directed by the network function 404. In this manner, the external transaction 426 requested by the external entity may be a procedure to be performed by the network function 404.

In some embodiments, the external transaction 426 begins when an external trigger 414 is received from an external entity 402 at a network function (e.g., a call control microservice of an SMF) 404. The actions and transactions performed by the network function 404 may be considered an external transaction 426. The network function 404 fetches 416 (e.g., queries/requests and receives) a state of the database entry (e.g., state data) from an external database 412. In some embodiments, the external database 412 may be accessed via a client interface. In some embodiments, the state indicates whether the database entry of the external database 412 is free (e.g., available), or whether a lock has been taken on the entry (e.g., the state data) of the external database 412. In some embodiments, when a lock has been taken on the entry of the external database 412, the state includes the information of the holder of the lock to the entry of the external database 412.

In some embodiments, when the lock on the entry of the external database 412 is not taken, network function 404 acquires the lock 417 (e.g., takes a lock 417 on the state data). After taking the lock 417, the network function 404 may request a first service (such as a transaction or a procedure) from first microservice instance 406. The request is handled locally by first microservice instance 406 and a response from the first microservice instance 406 contains result of service request.

In some embodiments, during the same external transaction 426, and while the lock 417 on the state data is still taken, the network function 404 may request 420 a second service from second microservice instance 408. In some embodiments, requests to a microservice instance may involve interaction 421 with an external entity (such as external entity 402). In some embodiments, microservice instances that interact with external entities may not respond back to the requesting network function 404 until external interaction is completed. This may require some additional complexity in the microservice instance to force an asynchronous external interaction into synchronous internal semantics. In other words, results from the external interaction may be used in subsequent operations by the second microservice instance 408 and/or by subsequent transactions coordinated by the network function 404. In some embodiments, semantics of such external request/response interaction may be transparent to the network function 404. The second micro service instance 408 may correlate the external response to original request. The response from the second microservice instance 408 may include the result of the service request 418 from the network function 404 to the second microservice instance 408.

In some embodiments, requests to the external entity (such as the external entity 402) may be performed in an asynchronous fashion where the request is responded to immediately by the second microservice instance 408 and the external response 420 becomes a trigger for a new transaction (containing the external response) from the second microservice instance 408 to the network function 404. The network function 404 may include a request 422, for an external server 410 (such as an external HTTP server) to perform a service. The request 422 may be sent to the external server 410, and a response from the external server 410 may contain the result of the service request 422. In some embodiments, request/response interactions with an external HTTP server may not require a database fetch and flush of state data because the response may only to return to the calling microservice instance (in this case, the network function 404).

Once the network function 404 determines that the task of responding to the external trigger 414 is completed, the network function 404 pushes the state (including any updated state data) to the entry of the external database 412 and releases 424 the lock to the external database 412. The network function 404 may then respond 428 to the external entity 402 if the original external trigger 414 was a request. In some embodiments, pushing the state to the entry of the external database 412 involves updating the state of the entry of the external database 412 with the results of the procedure as well as clearing the soft lock from the external database 412 entry indicating the procedure is complete and the soft lock is no longer needed.

As discussed above, the procedure (e.g., the transactions requested/performed by the first microservice instance 406, the second microservice instance 408, and the external server 410) performed by the network function 404 may collectively be an external transaction 426 from the perspective of the external entity 402. The elapsed time between external trigger 414 and external response 428 may be the lifetime of the external transaction 426.

Figure 5:
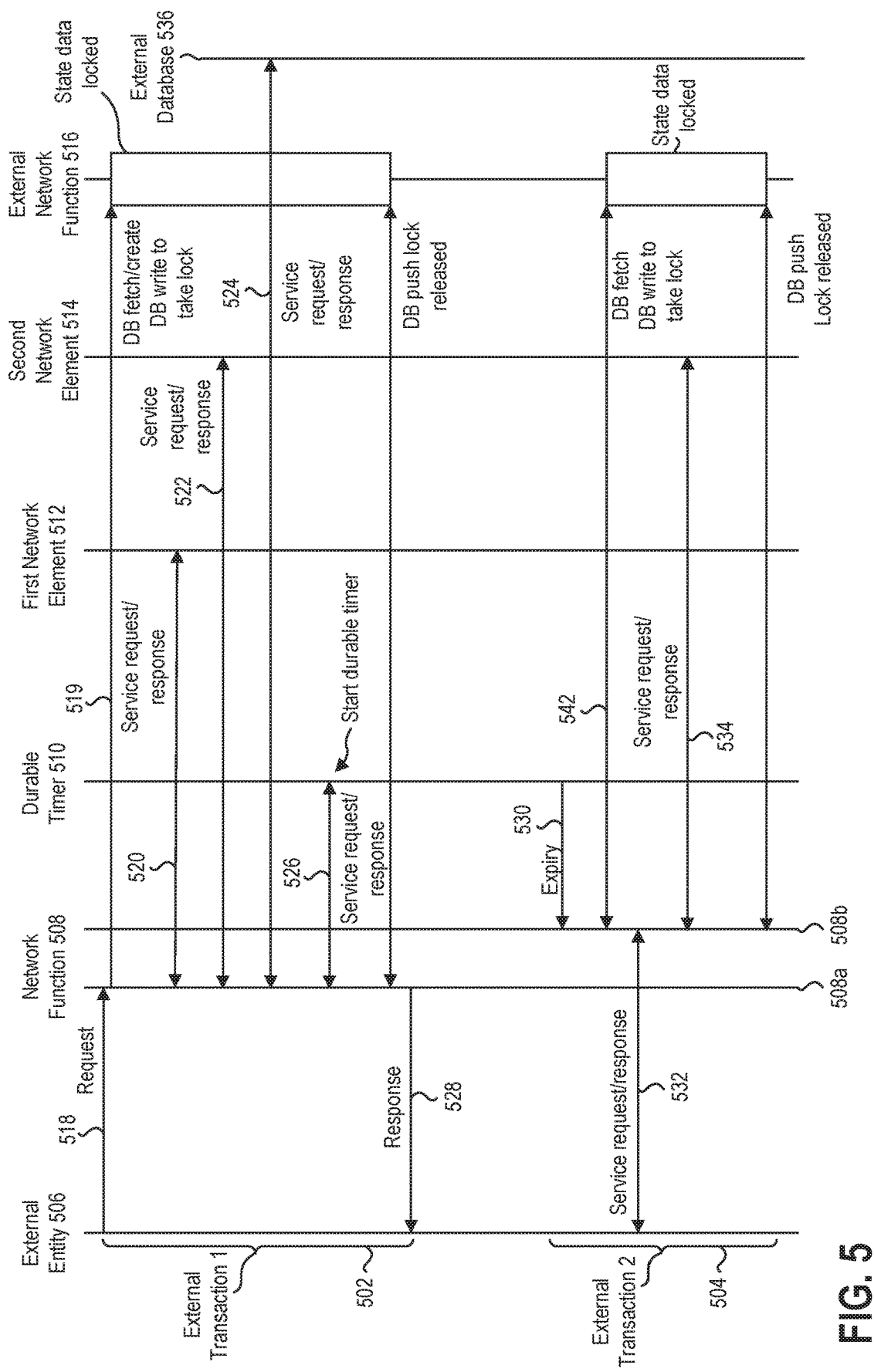
FIG. 5 is a representation of a network involving two non-colliding transactions implemented in a stateless cloud native architecture, according to at least one embodiment of the present disclosure.

FIG. 5 is a diagram showing the anatomy of multiple non-colliding or conflicting network (e.g., 3GPP) transactions in the same UE state, implemented in a stateless cloud native environment, according to some embodiments. The diagram depicts the flow of control in two consecutive external transactions 502 and 504.

In some embodiments, the first external transaction 502 begins when a request 518 is received at a network function 508 from an external entity (e.g., AMF) 506. In some embodiments, the network function 508 may include multiple microservice instances, including a first microservice instance 508a and a second microservice instance 508b. The network function 508 may assign different transactions to different microservice instances. In the embodiment shown, the first external transaction 502, received via request 518 at the network function 508 is assigned to the first microservice instance 508a.

The first microservice instance 508a queries 519 an external database 536 for session state of the user equipment (UE) using a message identifier (e.g., SUPI/PEI/SMF PDU Session ID). At this point, the first microservice instance 508a may acquire a lock to state data entries in the external database 536. The first microservice instance 508a may then perform one or more transactions related to the external request 518. For example, the first microservice instance 508a may identify that a query to a first network element 512 (such as a UDM) is to be performed. The first microservice instance 508a may send a first query 520 to the first network element 512. The first network element 512 may respond to the first query 520 (e.g., using HTTP request/response protocol). The first microservice instance 508a may then perform one or more actions related to the response by the first network element 512 response.

Based on, or separate from, the results of the actions, the first microservice instance 508a may then determines that a query to a second network element 514 (e.g., a PCF) is to be performed. The second microservice instance 508b may then send a second query 522 to the second network element 514. The second network element 514 may subsequently respond to the second query 522 (e.g., using HTTP request/response protocol). The first microservice instance 508a may then perform actions related to the response by the second network element 514.

In some embodiments, at this point, the first microservice instance 508a may send a third request 524 to an external network function 516 (e.g., a UPF). In some embodiments, the external network function 516 may communicate via packet forwarding control protocol (PFCP). In some embodiments, a PFCP microservice may implement the PFCP protocol. In some embodiments, the external network function 516 may be a separate network function from the network function 508. The PFCP microservice may be used as a communications interface between the network function 508 and the external network function 516. The PFCP microservice may send PFCP messages to the external network function 516 and receive a response from the external network function 516. The PFCP microservice may then respond to the first microservice instance 508a via an HTTP response.

After the first microservice instance 508a receives the response from the external network function 516 via PFCP microservice instance, the first microservice instance 508a may start a durable timer by invoking 526 the durable timer 510. To finish the first external transaction 502, the first microservice instance 508a then may push the state (including any updated state data) to the external database 536 and release the acquired lock to the external database 536. The first microservice instance 508a may then provide a response 528 to the external entity 506 for the request 518. While FIG. 5 indicates multiple internal transaction performed as part of the first external transaction 502, it should be understood that, in accordance with embodiments of the present disclosure, a single transaction, or more transactions than those shown, may be performed while the lock on the state data of the external database 536 is taken.

In some embodiments, a second external transaction 504 may not be initiated until the network function 508 receives a timer expiry event 530 from the durable timer 510. In some embodiments, the second external transaction 504 may be generated internally to the external entity 506. The second external transaction 504 may be triggered by the expiry timer at 530. In other words, the expiration of the timer may trigger the second external transaction. Nevertheless, the external entity may request 532 the second transaction of the network function 508. In some embodiments, the network function 508 may assign the second external transaction 504 to a second microservice instance 508b. In some embodiments, the second microservice instance 508b that handles the second external transaction 504 may be different from the first microservice instance 508a that handles the first external transaction 502.

During the second external transaction 504, the second microservice instance 508b may query 542 the external database 536 for the state data of the session. The state data stored in the external database may include updated state data, updated by the first microservice instance 508a during the first external transaction 502. Because the external database 536 holds the state data (including the updated state data) any instance of the network function 508 microservices may handle the incoming transaction. This may increase the versatility of the network.

To receive the updated state data, the receiving microservice instance (e.g., the second microservice instance 508b) may simply query the external database 536 for the state data and then act on the incoming transaction. The second microservice instance 508b may take another lock on the database. The second microservice instance 508b may then query and/or request 534 an action from the second network element 514. The second network element 514 may then respond via the HTTP request/response. At this point, the second microservice instance 508b may complete the work related to the second external transaction 504. The second microservice instance 508b may then push the state to the database and the release the lock.

Figure 6:
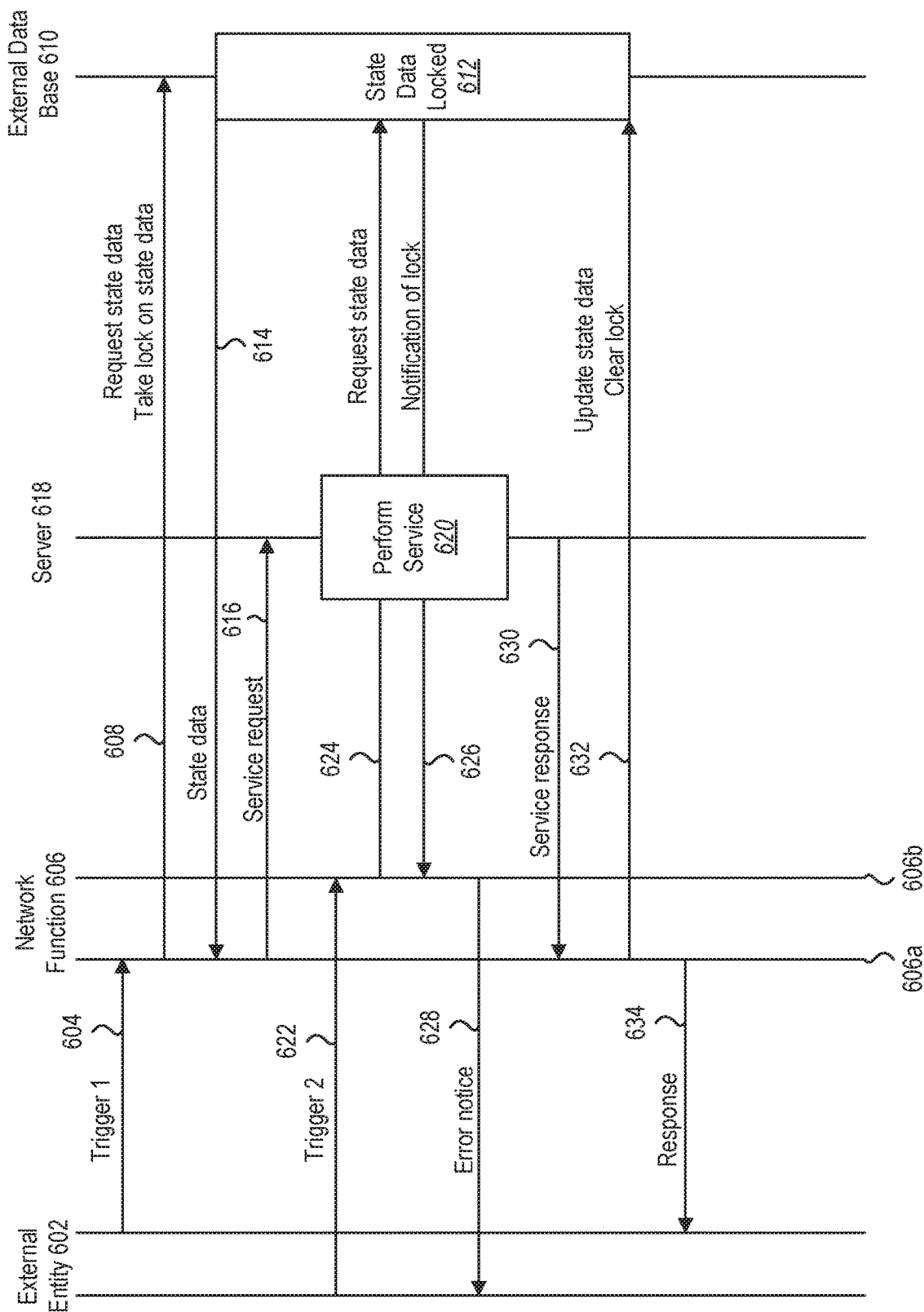
FIG. 6 is a representation of a network involving two colliding transactions implemented in a stateless cloud native architecture, according to at least one embodiment of the present disclosure.

FIG. 6 is a representation of a diagram showing the anatomy of two network transactions in the same UE state, according to at least one embodiment of the present disclosure. In the embodiment shown, the network transactions may "collide," or may try to utilize the state data at the same time. The embodiment shown depicts the flow of control during the collision of two transactions. In some embodiments, collision scenarios are generated by simultaneous transactions running in different instances of microservice instance of a network function (such as an SMF). In some embodiments, only server-side HTTP requests (with the network function as the server) that are handled by different microservice instances may result in collisions. In some embodiments, client-side HTTP requests are guaranteed to be returned to (response received by) the triggering microservice instance. The network diagram shown provides at least one mechanism to resolve the conflict shown.

In the embodiment shown, an external entity 602 may send a first trigger 604 to a network function 606. The first trigger 604 may include a request for the network function 606 to perform a first external transaction. In some embodiments, the network function 606 may assign the transaction to a first microservice instance 606a. To begin the first external transaction, the first microservice instance 606a may send a first request 608 to an external database 610. In some embodiments, the first request 608 may include a query to determine whether there is a lock on the state data stored on the external database 610. If there is no lock on the database, then the first request may fetch the state data from the external database 610 and take a lock 612 on the state data.

The external database 610 may send 614 the state data to the first microservice instance 606a. Using the received state data, the first microservice instance 606a may begin to perform the first external transaction requested by the external entity 602. For instance, the first microservice instance 606a may send a service request 616 to a server 618. The service request 616 may include any service request, such as a query for information, a processing request, any other service request, and combinations thereof. The server 618 may then perform 620 the service request.

At some point while the lock 612 is taken on the state data, the network function 606 may receive a second trigger 622 to perform a second external transaction. The network function 606 may assign the second external transaction to a second microservice instance 606b. While the embodiment shown in FIG. 6 shows the same network function 606 receiving the second trigger 622, it should be understood that a different network function may receive the second trigger 622 and assign the second external transaction to the second microservice instance 606b.

The second microservice instance 606b may send a second query 624 to the external database 610, requesting state data from the external database 610. The external database 610 may send a notification 626 to the second microservice instance 606b that the lock 612 on the state data is taken. When the second microservice instance 606b receives the notification 626, the second microservice instance may identify a collision between the requested first transaction being handled by the first microservice instance 606a and the requested second transaction being handled by the second microservice instance 606b. In response to the notification 626 (and/or the identification of the collision), the second microservice instance 606b may send an error notice 628 to the external entity 602. The error notice 628 may include an indication that the requested transaction may not be performed.

In some embodiments, when taking the lock on the external database 610, the first microservice instance 606a may store, either on the external database 610 or on a separate external storage, a state data status. The state data status may include an identification of the owning microservice instance (in this case, the first microservice instance 606a). The notification 626 of the lock 612 on the state data may include some or all of the state data status. The second microservice instance may send this state data status (including the owning microservice identity) to the external identity as part of the error notice 628. In this manner, the external entity 602 may work to resolve the collision to perform the second external transaction. For example, the external entity 602 may subsequently assign the second external transaction to the first microservice instance 606a, or may wait until a timer expires or the first microservice instance 606a completes the first external transaction to re-send the second trigger 622.

After the server 618 performs 620 the service, the server 618 may send the response 630 to the first microservice instance 606a. The first microservice instance 606a may then update 632 the state data and clear the lock 612 on the state data in the external database 610. The first microservice instance 606a may then send a response 634 to the external entity including the results of the first external transaction.

Figure 7:
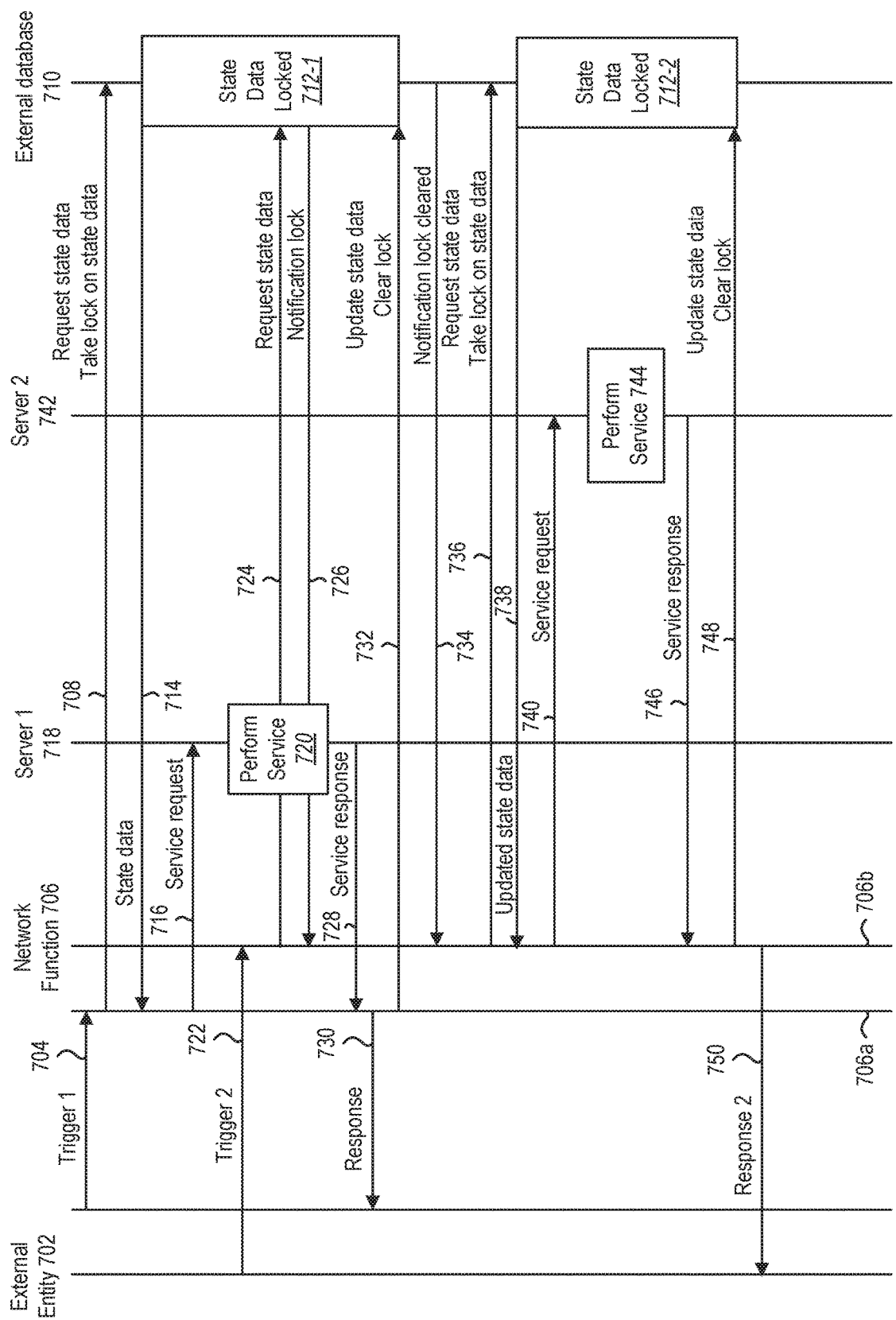
FIG. 7 is a representation of another network involving two colliding transactions implemented in a stateless cloud native architecture, according to at least one embodiment of the present disclosure.

FIG. 7 is a representation of a diagram showing the anatomy of two network transactions in the same UE state, according to at least one embodiment of the present disclosure. In the embodiment shown, the network transactions may "collide," or may try to utilize the state data at the same time. The embodiment shown depicts the flow of control during the collision of two transactions. In some embodiments, collision scenarios are generated by simultaneous transactions running in different instances of microservice instance of a network function (such as an SMF). In some embodiments, only server-side HTTP requests (with the network function as the server) that are handled by different microservice instances may result in collisions. In some embodiments, client-side HTTP requests are guaranteed to be returned to (response received by) the triggering microservice instance. The network diagram shown provides at least one mechanism to resolve the conflict shown.

In the embodiment shown, an external entity 702 may send a first trigger 704 to a network function 706. The first trigger 704 may include a request for the network function 706 to perform a first external transaction. In some embodiments, the network function 706 may assign the transaction to a first microservice instance 706a. To begin the first external transaction, the first microservice instance 706a may send a first request 708 to an external database 710. In some embodiments, the first request 708 may include a query to determine whether there is a lock on the state data stored on the external database 710. If there is no lock on the database, then the first request may fetch the state data from the external database 710 and take a first lock 712-1 on the state data.

The external database 710 may send 714 the state data to the first microservice instance 706a. Using the received state data, the first microservice instance 706a may begin to perform the first external transaction requested by the external entity 702. For instance, the first microservice instance 706a may send a service request 716 to a first server 718. The service request 716 may include any service request, such as a query for information, a processing request, any other service request, and combinations thereof. The first server 718 may then perform 720 the service request.

At some point while the first lock 712-1 is taken on the state data, the network function 706 may receive a second trigger 722 to perform a second external transaction. The network function 706 may assign the second external transaction to a second microservice instance 706b. While the embodiment shown in FIG. 7 shows the same network function 706 receiving the second trigger 722, it should be understood that a different network function may receive the second trigger 722 and assign the second external transaction to the second microservice instance 706b.

The second microservice instance 706b may send a second query 724 to the external database 710, requesting state data from the external database 710. The external database 710 may send a notification 726 to the second microservice instance 706b that the first lock 712-1 on the state data is taken. When the second microservice instance 706b receives the notification 726, the second microservice instance may identify a collision between the requested first transaction being handled by the first microservice instance 706a and the requested second transaction being handled by the second microservice instance 706b. Upon identification of the collision (e.g., upon receipt of the notification 726 of the lock on the state data), the second microservice instance 706b may wait until the first lock 712-1 is cleared to execute the second external transaction requested by the second trigger 722.

After the first server 718 performs 720 the service, the first server 718 may send a service response 728 to the first microservice instance 706a. The first microservice instance 706a may then send a first response 730 to the external entity 702 and update 732 the state data and clear the first lock 712-1 on the state data at the external database 710.

In some embodiments, after the first lock 712-1 is cleared, the second microservice instance 706b may begin to execute the second external transaction. The second microservice instance 706b may identify that the first lock 712-1 is cleared in any manner. For example, the external database 710 may send the second microservice instance 706b a notification 734 that the lock has cleared. In some embodiments, the network function 706 and/or the first microservice instance 606a may send the second microservice instance 706b a notification that the lock has cleared. In some embodiments, the second microservice instance 706b may wait for a period of time (e.g., wait until a timer has expired) to begin performing the second transaction. In some embodiments, the second microservice instance 706b may repeatedly send requests to the external database 710 after waiting for a timer to expire until the external database 710 indicates that the first lock 712-1 has cleared.

After the second microservice instance 706b has waited until the first lock 712-1 has cleared, the second microservice instance 706b may then execute the second external transaction. Executing the second external transaction may include sending 736 another request for state data from the external database 710. The external database 710 may send 738 the state data to the second microservice instance 706b and take a second lock 712-2 on the state data at the external database 710. In some embodiments, the state data sent 738 to the second microservice instance 706b may include updated state data. For example, the state data sent 738 may include the updated 732 state data sent to the external database 710 when clearing the first lock 712-1.

The second microservice instance 706b may then execute the second external transaction using the updated state data. For example, the second microservice instance 706b may send 740 a service request to a second server 742. While the second server 742 is shown as separate from the first server 718, it should be understood that the service request may be sent 740 to the first server 718, depending on the elements of the request and the qualities of the first server 718 and/or the second server 742. The second server 742 may perform 744 the second service and send a service response 746 to the second microservice instance 706b. The second microservice instance 706b may then update 748 the state data and clear the second lock 712-2 on the state data at the external database 710. The second microservice instance may then send a response 750 to the external entity 702, thereby completing the second external transaction.

Figure 8:
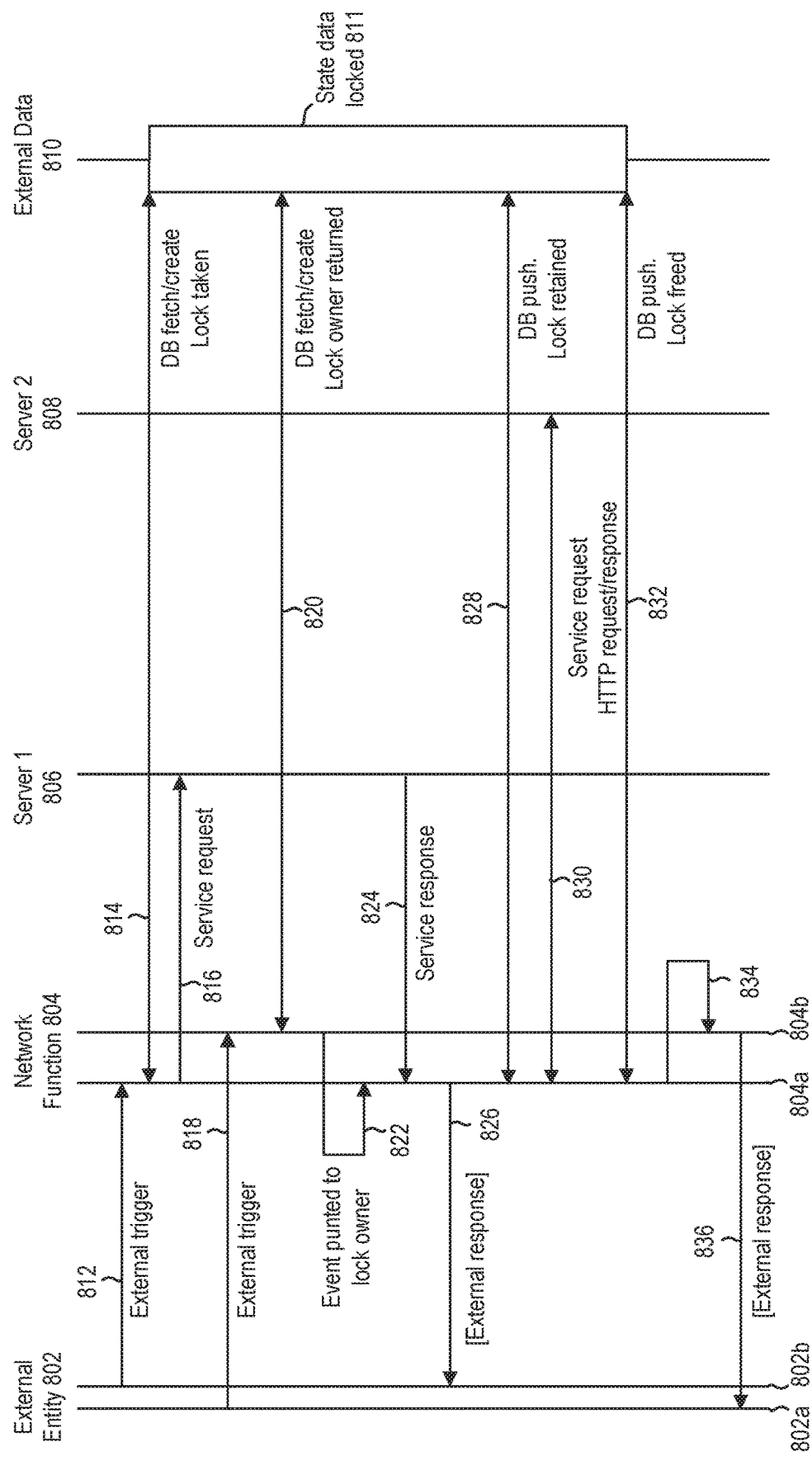
FIG. 8 is a representation of yet another network involving two colliding transactions implemented in a stateless cloud native architecture, according to at least one embodiment of the present disclosure.

FIG. 8 is a diagram showing a collision between two network (e.g., 3GPP) transactions implemented in a stateless cloud native environment, according to some embodiments. The embodiment shown depicts the flow of control during the collision of two transactions. In some embodiments, collision scenarios are generated by simultaneous transactions running in different instances of microservice instance of a network function (such as an SMF). In some embodiments, only server-side HTTP requests (with the network function as the server) that are handled by different microservice instances may result in collisions. In some embodiments, client-side HTTP requests are guaranteed to be returned to (response received by) the triggering microservice instance. The network diagram shown provides at least one mechanism to resolve the conflict shown.

In some embodiments, in order to resolve collisions, the colliding event is punted (e.g., reassigned) to the microservice instance that owns the lock. In the embodiment shown, a transaction starts with an external trigger 812 received at the network function 804 from an external entity 802. In some embodiments, there may be multiple instances of external entities 802 such as 802a and 802b. A first microservice instance 804a from the network function 804 sends a query 814 to an external database 810 to establish a lock over entries of state data in the external database 810. In some embodiments, under "check and set" (CAS) functionality, as only one lock holder is guaranteed, no other microservice instance of the network function 804 may be able to take the lock 811. The first microservice instance 804a may then request 816 a service from a first external server 806 (e.g., an external network element).

A collision event occurs when the external database 810 is read by another microservice instance. The lock 811 is seen by the colliding microservice instance, and the event associated with the colliding microservice instance may be reassigned 822 (e.g., punted) to the microservice instance currently owning the lock. In some embodiments (as described in relation to FIG. 7), the colliding microservice instance may hold the event until the lock is released. If the currently owning microservice instance is not alive (e.g., is pulled, modified, and/or deleted by a network administrator and/or engineer), the lock 811 may be taken by the colliding first microservice instance event processed as normal.

A second external trigger 818 may be received at the network function 804 and handed off to a second microservice instance 804b. In some embodiments, the second external trigger 818 may be received from the same external entity or a different external entity. The second microservice instance 804b may query 820 the state data from the external database 810. In some embodiments, the external database 810 may return the database entry. For example, the external database 810 may return a state data status. Based on the received database entry, the second microservice instance 804b may determine, that the lock 811 is already taken by the first microservice instance 804a. The state data status may include a microservice instance identifier that identifies the first microservice instance 804a as the owning microservice instance. The second microservice instance 804b may reassign 822 (e.g., punt) the transaction to the first microservice instance 804a that owns the lock 811 on the external database 810.

The first microservice instance 804a may receive a response 824 from the first external server 806. The first microservice instance 804a may then respond 826 to the first external trigger 812 generated by the first external entity 802a. The first microservice instance 804a may then complete the first external transaction and push 828 updated state data to the external database 810. Since a second transaction reassigned 822 to the first microservice instance 804a by the second microservice instance 804b is still pending, the lock may be retained by the first microservice instance 804a.

To complete the second external transaction reassigned 822 by the second microservice instance, the first microservice instance 804a may request 830 a service and receive a response from a second server 808. The first microservice instance 804a may then complete the transaction and update 832 the state data at the to external database 810. At this time, because no transaction is pending, the external database 810 may free (e.g., clear, release) the lock. The first microservice instance 804a may then send 834 the response to the second transaction to the second microservice instance 804b. The second microservice instance 804b may then respond 836 to the second external trigger 818 generated by the second external entity 802b.

Figure 9:
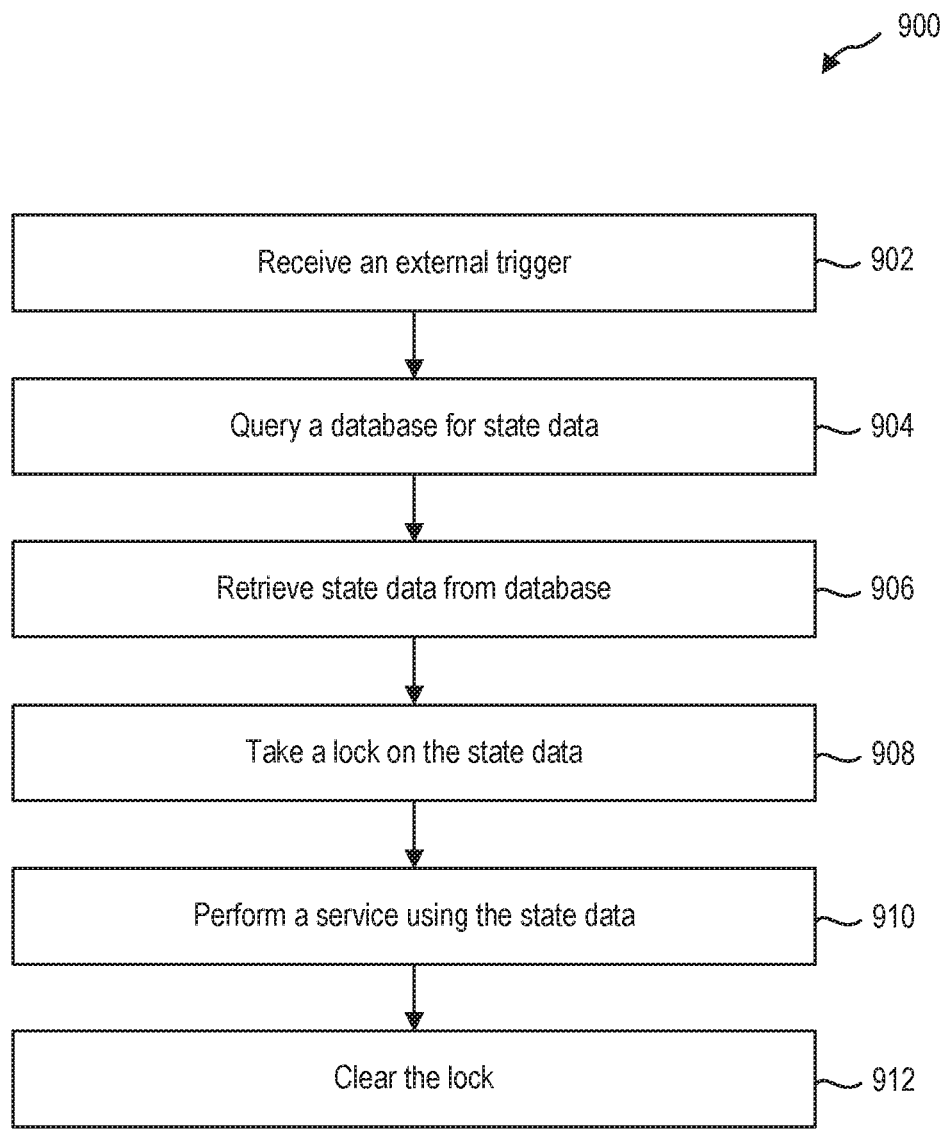
FIG. 9 is a representation of a method for performing a transaction implemented in a stateless cloud native architecture, according to at least one embodiment of the present disclosure.

FIG. 9 is a representation of a method 900 for performing a transaction implemented on a network function utilizing CNA, according to at least one embodiment of the present disclosure. The method 900 may be performed by the system 200 of FIG. 2. Specifically, the network function may be based on stateless microservices, and instruct the microservice manager 201 to assign a transaction to a microservice instance 202-n.

In some embodiments, the network function may receive 902 an external trigger to perform a service. The external trigger may include an instruction for a microservice to perform the service. The first microservice instance assigned by the network function may then query 904 an external database, which is external to the network function, for state data to perform the service. The state data may include state information from previous transactions relevant to the current transaction which may affect processing of the transaction.

In accordance with embodiments of the present disclosure, the first microservice instance assigned by the network function may retrieve 906 the state data from the external database and take 908 a lock on the state data. Taking 908 the lock on the state data may make the state data unavailable except by the microservice instance. While the lock is in place and using the received state data, the microservice instance may perform 910 the assigned service. After the service is complete, the microservice instance may clear 912 the lock on the state data in the external database, such that the state data is available (e.g., accessible and/or retrievable by other microservice instances).

Figure 10:
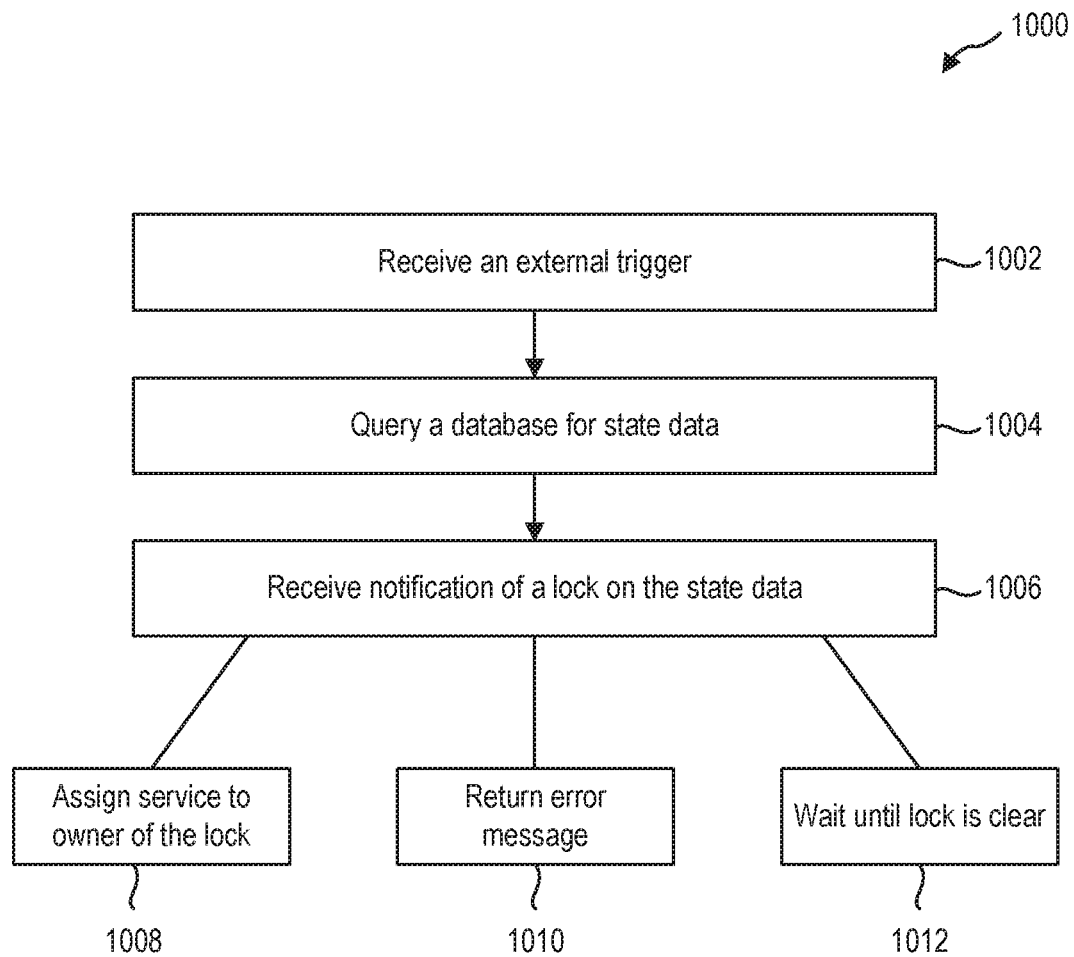
FIG. 10 is a representation of another method for performing a transaction implemented in a stateless cloud native architecture, according to at least one embodiment of the present disclosure.

FIG. 10 is a representation of a method 1000 for performing a transaction implemented on a network function utilizing CNA, according to at least one embodiment of the present disclosure. The method 1000 may be performed by the system 200 of FIG. 2. Specifically, the network function may be based on stateless microservices, and instruct the microservice manager 201 to assign a transaction to a microservice instance 202-n.

In the method 1000, a microservice instance may receive 1002 an external trigger to perform a service. The microservice instance may query 1004 an external database, which is external to the network function, for state data to perform the service. The state data may include state information from previous transactions relevant to the current transaction which may affect processing of the transaction.

After querying 1004 the external database, the microservice instance may receive 1006 a notification of a lock taken on the state data at the external database. In some embodiments, receiving 1006 the notification of the lock may include the first microservice instance analyzing the state data and determining that a lock has been taken on the state data. Depending on the nature of the assigned service, the microservice instance may assign 1008 the owner of the lock the service, return 1010 an error message to the originator of the external trigger, or wait 1012 until the lock is cleared to perform the service.

Figure 11:
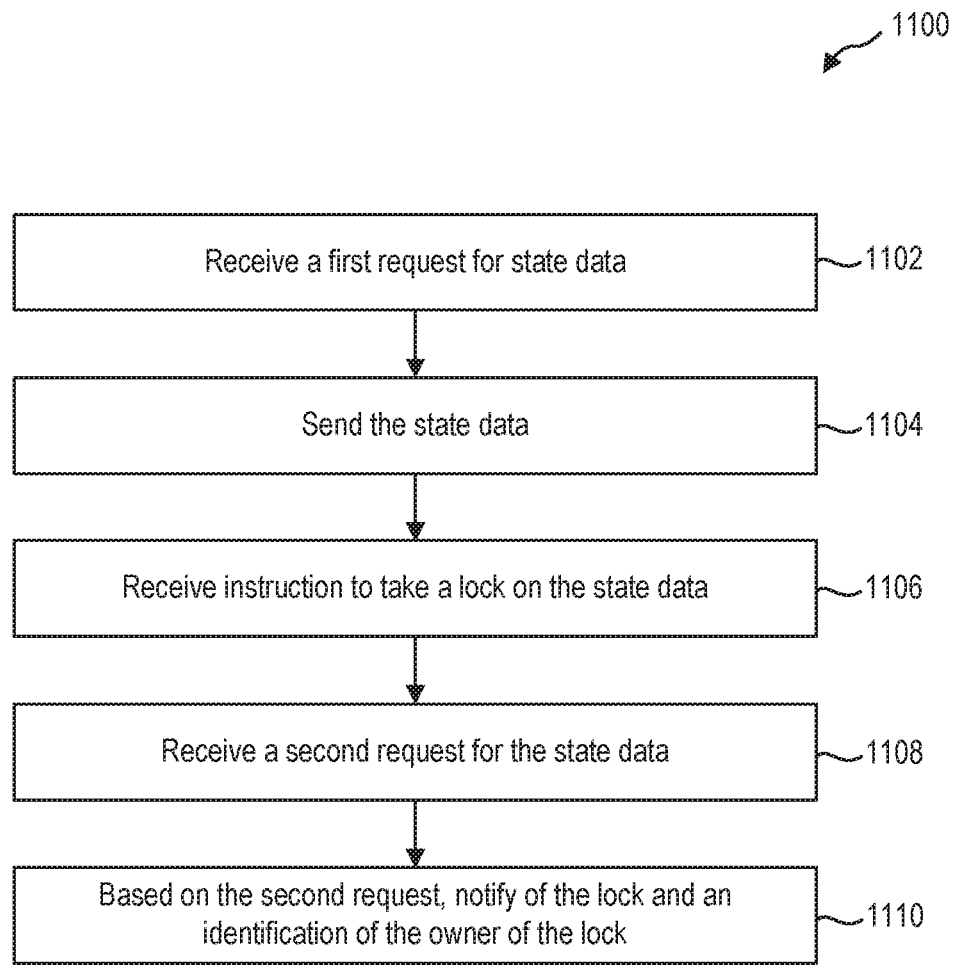
FIG. 11 is a representation of a method for managing state data for use by a network function implementing a stateless cloud native architecture, according to at least one embodiment of the present disclosure.

FIG. 11 is a representation of a method 1100 for managing state data for use by a network function utilizing CNA, according to at least one embodiment of the present disclosure. The network function may be based on stateless microservices which are loosely coupled and independently deployable to perform discrete services. The method 1100 may be performed by the system 200 of FIG. 2. Specifically, the method may be operated by the external database 206 and receive queries for state data 205 from microservice instances 202-n.

The external database may receive 1102 a first request for state data from a first microservice instance. The state data may be stored on the external database and include information from previously performed transactions to affect processing of subsequent transactions. Based on the first request, the database may send 1104 the state data to the first microservice instance. The database may also receive 1106 an instruction from the first microservice instance to take a lock on the state data. Taking the lock on the state data may result in the database making the state data unavailable except by the first microservice instance. The instruction may include state data status, which may include an identifier of the owning microservice instance, which in this case is the first microservice instance.

While the lock in taken, and after receiving the instruction to take the lock on the state data, the external database may receive 1108 a second request for the state data from a second microservice instance. Based on the second request and the lock taken on the state data, the external database may notify 1110 the second microservice of the lock taken on the state data. The external database may further notify 1110 the second microservice of the identification of the owning microservice instance (e.g., the first microservice instance in this case).

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

Systems and methods according to the present disclosure may be performed using any of the technological systems described herein. Furthermore, embodiments of the present disclosure may be implemented using computing technology, hardware and software, not currently available, or which may become available in the future.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for performing a transaction implemented by a network function utilizing cloud native architecture based on stateless microservices, the network function being stateful through successive transactions, the stateless microservices being independently deployable, the method comprising:
   receiving a first external trigger at the network function to perform a first transaction, the first transaction utilizing state data that includes information from previous transactions to affect processing of the first transaction, wherein the network function assigns a microservice instance to perform the first transaction, and wherein the microservice instance does not include the state data from the previous transactions;
   querying an external database for the state data to be used by the microservice instance while performing the first transaction, the external database being external to the microservice instance;
   retrieving the state data from the external database;
   taking a lock on the state data in the external database such that the state data is unavailable except by the microservice instance;
   invoking, by the network function, a durable timer indicating a duration of time in which the state data is locked;
   using the state data, performing the first transaction at the microservice instance; and
   clearing the lock on the state data in the external database based on performing the transaction and further based on an expiration of the durable timer invoked by the network function.

2. The method of claim 1, further comprising updating the state data on the external database.

3. The method of claim 1, further comprising associating an identity of the network function with the state data on the network function.

4. The method of claim 1, further comprising sending a result of the first transaction.

5. The method of claim 1, wherein the external trigger is a first external trigger, and further comprising invoking a timer, an expiration of the timer triggering a second external trigger for a second transaction.

6. The method of claim 1, wherein the first transaction includes a plurality of transactions.

7. The method of claim 1, wherein the first transaction includes communication with an external network element.

8. The method of claim 1, wherein taking the lock includes storing a state data status in external storage, the external storage being external to the network function.

9. A method for performing a procedure implemented by a network function utilizing cloud native architecture, the procedure including a plurality of transactions performed by stateless microservices, the stateless microservices being independently deployable, the procedure being stateful such that subsequent transactions within the procedure use results of preceding transactions within the procedure, the method comprising:
   at a first microservice instance assigned by the network function to perform a first transaction of the procedure, the first transaction utilizing state data:
      querying an external database for state data to be used while performing the first transaction, wherein the state data includes information from previous transactions within the procedure to affect processing of the first transaction, the external database being external to the first microservice instance;
      retrieving the state data from the external database; and
      taking a lock on the state data in the external database such that the state data is unavailable except by the first microservice instance;
      invoking a durable timer indicating a duration of time in which the state data is locked; and
   at a second microservice instance assigned by the network function to perform a second transaction of the procedure, the second transaction utilizing the state data:
      querying the external database for the locked state data to be used to perform the second transaction and to affect results of the second transaction, the external database being external to the second microservice instance; and
      receiving a notification that the lock on the state data is taken and that the state data is unavailable, wherein the lock on the state data being taken and the state data being unavailable is based at least in part on whether the durable timer has expired.

10. The method of claim 9, further comprising, at the second microservice instance, waiting to perform the second transaction until the lock is cleared.

11. The method of claim 9, further comprising, at the second microservice instance, based on the lock, assigning the second transaction to the first microservice instance.

12. The method of claim 11, further comprising, at the first microservice instance, performing the second transaction assigned by the second microservice instance.

13. The method of claim 12, further comprising, at the first microservice instance, sending a result of the second transaction to the second microservice instance.

14. The method of claim 9, further comprising, at the first microservice instance, performing the first transaction using the state data.

15. The method of claim 9, further comprising, at the first microservice instance prior to querying the external database, receiving a first external trigger to perform the first transaction.

16. The method of claim 9, further comprising, at the second first microservice instance prior to querying the external database, receiving a second external trigger to perform the second transaction.

17. A method for managing state data for use by a network function utilizing cloud network architecture, the network function being based on stateless microservices, the stateless microservices being independently deployable, comprising:
   receiving a first request for the state data from a first microservice instance, wherein the state data includes information from previous transactions to affect processing of subsequent transactions;
   based on the first request, sending the state data to the first microservice instance;
   receiving an instruction from the first microservice instance to take a lock on the state data such that the state data is unavailable except by the first microservice instance, the instruction including an identification of the first microservice instance;

invoking, by the network function, a durable timer indicating a duration of time in which the state data is locked;

while the lock is taken, preventing other microservice instances from retrieving the state data;

after receiving the instruction, receiving a second request for the state data from a second microservice instance; and based on the second request, notifying the second microservice instance of the lock and the identification of the first microservice instance to the second microservice instance.

18. The method of claim 17, further comprising:

while the lock is taken, from the first microservice instance, updated state data; and changing the state data with the updated state data.

19. The method of claim 18, wherein the instruction is a first instruction and the lock is a first lock and the identification is a first identification, and further comprising:

receiving a second instruction to clear the lock based on performance of a transaction by the first microservice and further based on an expiration of the durable timer invoked by the network function;

based on the second instruction, clearing the lock such that the updated state data is available;

after clearing the lock, receiving a third request for the state data from a third microservice instance;

based on the third request, sending the updated state data to the third microservice instance; and receiving a third instruction to take a second lock on the updated state data, the second instruction including a second identification of the third microservice instance.

20. The method of claim 17, further comprising, after notifying the second microservice instance of the lock and the identification of the first microservice instance, assigning the second request to the first microservice instance.

* * * * *